United States Patent
Overfield et al.

(10) Patent No.: US 9,189,626 B1
(45) Date of Patent: Nov. 17, 2015

(54) TECHNIQUES FOR DETECTING MALICIOUS CODE

(71) Applicant: Symantec Corporation, Mountain View, CA (US)

(72) Inventors: Adam Overfield, San Francisco, CA (US); Kevin Roundy, El Segundo, CA (US); Jie Fu, Chengdu (CN); Tao Cheng, Zigong (CN); Zhi Kai Li, Zigong (CN)

(73) Assignee: Symantec Corporation, Mountain View, CA (US)

( * ) Notice: Subject to any disclaimer, the term of this patent is extended or adjusted under 35 U.S.C. 154(b) by 42 days.

(21) Appl. No.: 14/035,519

(22) Filed: Sep. 24, 2013

(51) Int. Cl.
*G06F 21/56* (2013.01)
*H04L 29/06* (2006.01)

(52) U.S. Cl.
CPC ............... *G06F 21/56* (2013.01); *H04L 63/14* (2013.01); *H04L 2463/144* (2013.01)

(58) Field of Classification Search
None
See application file for complete search history.

(56) References Cited

U.S. PATENT DOCUMENTS

| | | | |
|---|---|---|---|
| 8,260,914 B1 * | 9/2012 | Ranjan | 709/224 |
| 8,578,493 B1 * | 11/2013 | Cowan et al. | 726/23 |
| 2013/0232574 A1 * | 9/2013 | Carothers | 726/22 |

OTHER PUBLICATIONS

Bruneau, DNS Sinkhole, SANS Institute, 2010.*
Law et al., A Host-Based Approach to BotNet Investigation, ICST, 2010.*

* cited by examiner

*Primary Examiner* — Minh Dinh
(74) *Attorney, Agent, or Firm* — Wilmer Cutler Pickering Hale and Dorr LLP (57) ABSTRACT

Techniques for detecting malicious code are disclosed. In one particular embodiment, the techniques may be realized as a method for detecting malicious code comprising the steps of identifying a query to a domain name service that resolves to a local address; identifying the process that originated the identified query; and designating the identified process as infected based on identifying the process as having originated the query that resolved to a local address.

19 Claims, 5 Drawing Sheets

TECHNIQUES FOR DETECTING MALICIOUS CODE

FIELD OF THE DISCLOSURE

The present disclosure relates generally to computer security and, more particularly, to techniques for detecting malicious code.

BACKGROUND OF THE DISCLOSURE

Malware authors have devised many ingenious methods of protecting the identity of their Command and Control (C2) servers. One common method is to use DNS as a layer of indirection that protects the IP address of C2 servers. A recent malware trend has emerged in which a botnet or Advanced Persistent Threat (APT) uses a fully qualified domain name (FQDN) and registers it with DNS public resolvers, but with a short time to live (TTL) so that its bots must continually poll a public DNS resolver to obtain the identity of the C2 server. Since the C2 server rarely needs to send any commands, this technique sets the FQDN to resolve to localhost, which causes all bots to send their C2 traffic back to themselves, suppressing traffic that would otherwise be susceptible to analysis by security devices attached to the network. When the C2 server awakes, the domain name entry is changed to the C2 server's IP address, and once C2 commands have been successfully communicated, the C2 server goes back to sleep and the DNS entry is set to localhost once more.

In view of the foregoing, it may be understood that there may be significant problems and shortcomings associated with current data security technologies.

SUMMARY OF THE DISCLOSURE

Techniques for detecting malicious code are disclosed. In one particular embodiment, the techniques may be realized as a method for detecting malicious code comprising the steps of identifying a query to a domain name service that resolves to a local address; identifying the process that originated the identified query; and designating the identified process as infected based on identifying the process as having originated the query that resolved to a local address.

In accordance with other aspects of this particular embodiment, the method may further comprise the steps of identifying a domain name used in the identified query and blocking a subsequent query based on a relationship between the subsequent query and the identified fully qualified domain name.

In accordance with further aspects of this particular embodiment, the identified domain name may be a fully qualified domain name.

In accordance with further aspects of this particular embodiment, the subsequent query may be blocked based on comparing a domain name used in the subsequent query to the identified domain name.

In accordance with further aspects of this particular embodiment, the method may further comprise identifying an IP address associated with the identified fully qualified domain name, wherein the subsequent query uses the identified IP address.

In accordance with other aspects of this particular embodiment, designating the identified process as infected may further be based one or more additional queries prior to the identified query that each resolved to a local address.

In accordance with other aspects of this particular embodiment, the techniques may be realized as at least one non-transitory processor readable storage medium storing a computer program of instructions configured to be readable by at least one processor for instructing the at least one processor to execute a computer process for performing a method of one of the embodiments.

In another particular embodiment, the techniques may be realized as an article of manufacture for detecting malicious code comprising at least one processor readable storage medium and instructions stored on the at least one medium. The instructions are configured to be readable from the at least one medium by at least one processor and thereby cause the at least one processor to operate so as to identify a query to a domain name service that resolves to a local address; identify the process that originated the identified query; and designate the identified process as infected based on identifying the process as having originated the query that resolved to a local address.

In accordance with other aspects of this particular embodiment, the instructions may further be configured to cause the at least one processor to operate so as to identify a domain name used in the identified query and block a subsequent query based on a relationship between the subsequent query and the identified fully qualified domain name.

In accordance with further aspects of this particular embodiment, the identified domain name may be a fully qualified domain name.

In accordance with further aspects of this particular embodiment, the subsequent query may be blocked based on comparing a domain name used in the subsequent query to the identified domain name.

In accordance with further aspects of this particular embodiment, the instructions may be further configured to cause the at least one processor to operate so as to identify an IP address associated with the identified fully qualified domain name. The subsequent query may use the identified IP address.

In accordance with other aspects of this particular embodiment, designating the identified process as infected may further be based one or more additional queries prior to the identified query that each resolved to a local address.

In another particular embodiment, the techniques may be realized as a system for detecting malicious code comprising one or more processors communicatively coupled to a network. The one or more processors are configured to identify a query to a domain name service that resolves to a local address; identify the process that originated the identified query; and designate the identified process as infected based on identifying the process as having originated the query that resolved to a local address.

In accordance with other aspects of this particular embodiment, the one or more processors may further be configured to identify a domain name used in the identified query and block a subsequent query based on a relationship between the subsequent query and the identified fully qualified domain name.

In accordance with further aspects of this particular embodiment, the identified domain name may be a fully qualified domain name.

In accordance with further aspects of this particular embodiment, the subsequent query may be blocked based on comparing a domain name used in the subsequent query to the identified domain name.

In accordance with further aspects of this particular embodiment, the one or more processors may be further configured to operate so as to identify an IP address associated with the identified fully qualified domain name. The subsequent query may use the identified IP address.

In accordance with other aspects of this particular embodiment, designating the identified process as infected may further be based one or more additional queries prior to the identified query that each resolved to a local address.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
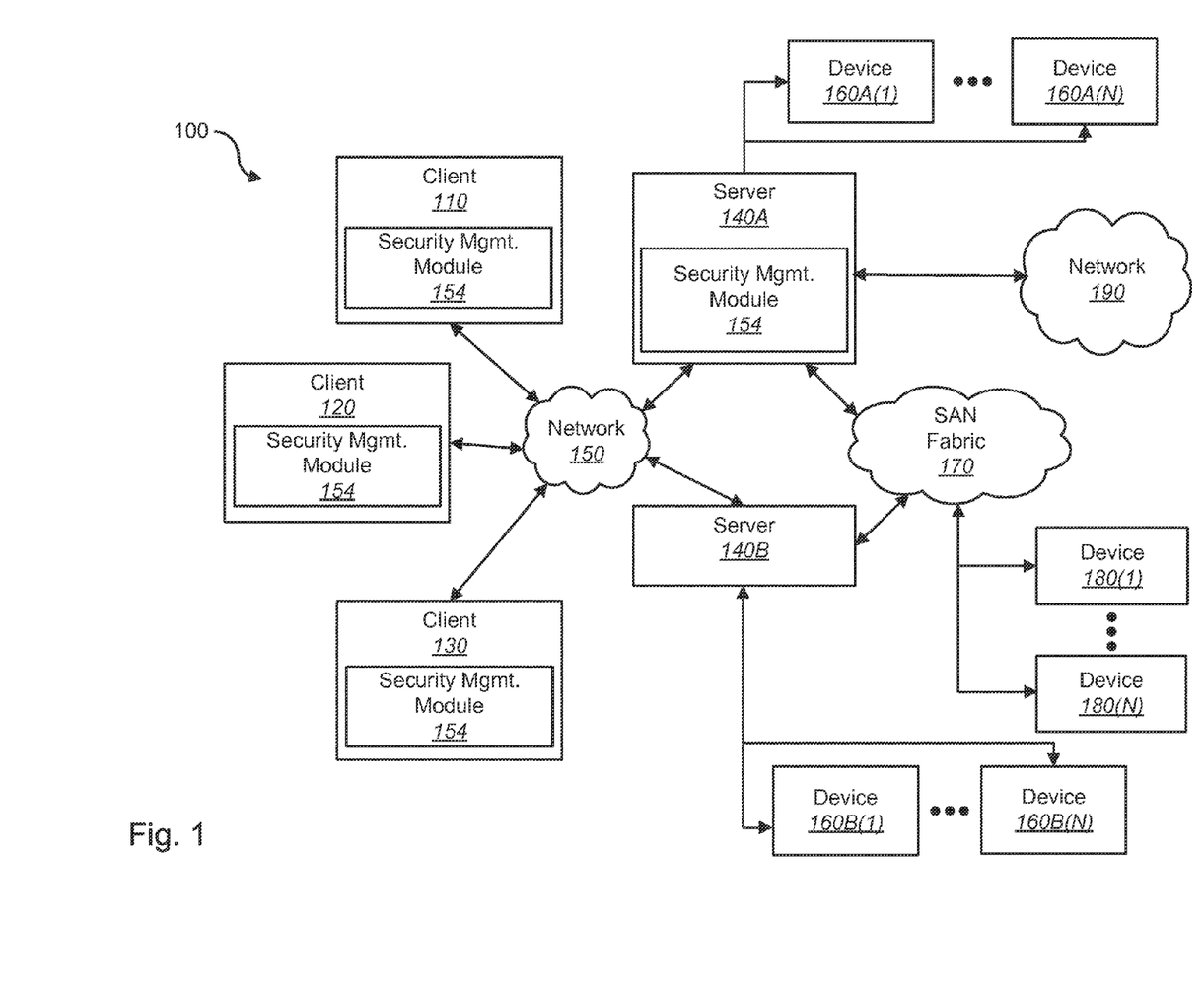
FIG. 1 shows a block diagram depicting a network architecture in accordance with an embodiment of the present disclosure.

FIG. 1 shows a block diagram depicting a network architecture 100 for detecting malicious code in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., security management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
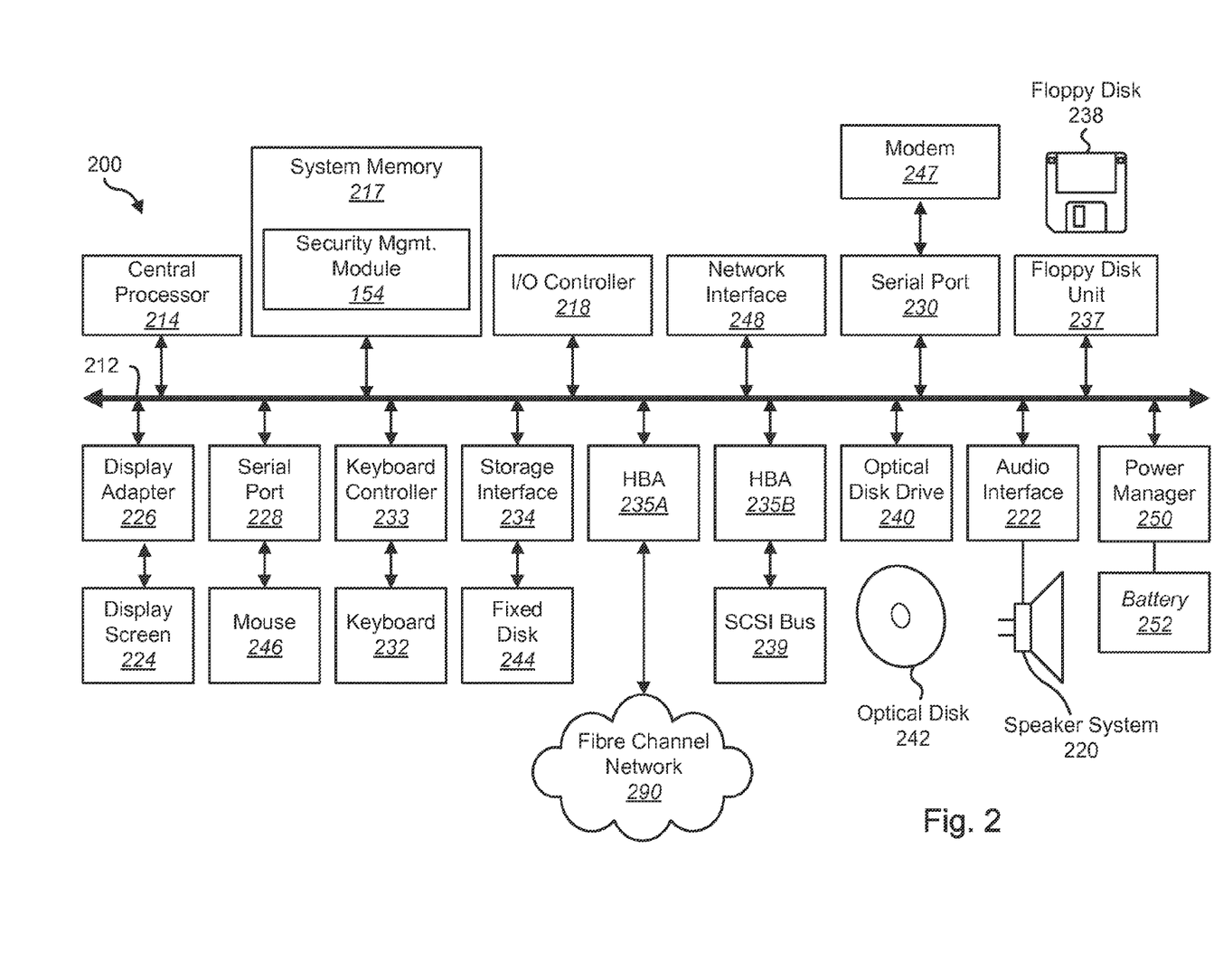
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, servers 140A and 140B may contain one or more portions of software for implementation of security management processes such as, for example security management module 154. Further, one or more portions of the security management module 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, detection of infected processes including security management module 154 may be implemented as part of a cloud computing environment.

Security management module 154 may monitor the use of network traffic by a variety of system processes. Security management module 154 may be implemented, for example, as a standalone utility or as part of a security application, and may monitor any network traffic originating with particular processes. The security management module 154 may be activated automatically as part of the initiation of particular applications or utilities. On some systems, the security management module 154 may represent a background process that monitors programs continually as part of required security protocols on the system. The security management module 154 may also be included as a browser plug-in or other component integrated with network-related software.

According to some embodiments, the security management module 154 may monitor all network traffic originating at a client system in order to identify any traffic that comes from a particular list of processes for which the security management module 154 is responsible for monitoring. The security management module 154 may compare any identified traffic from the listed processes against approved network traffic types in order to detect anomalous traffic. In some implementations, the security management module 154 may direct the system to block the anomalous traffic and may report the process that originated the traffic as an infected or potentially infected process.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, security management module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
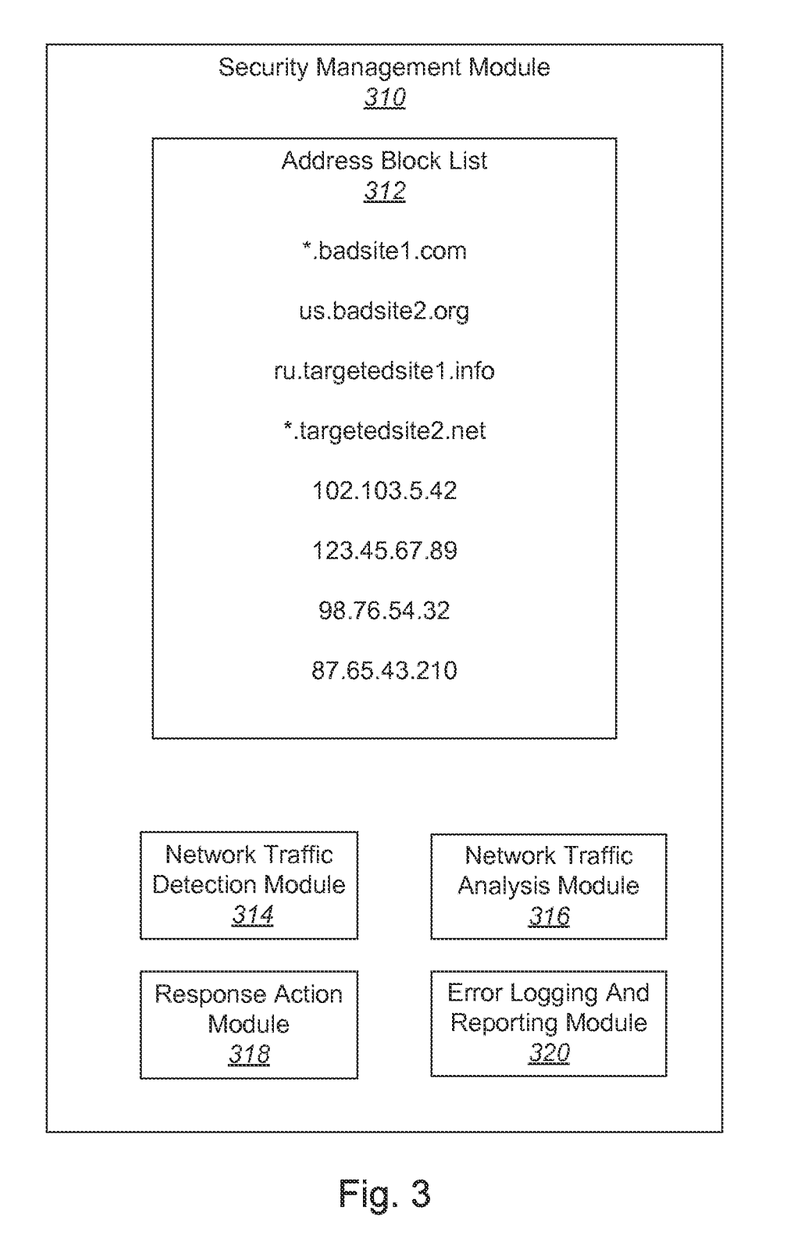
FIG. 3 shows a security management module in accordance with an embodiment of the present disclosure.

Referring to FIG. 3, there is shown a security management module 310 in accordance with an embodiment of the present disclosure. As illustrated, the security management module 310 may contain one or more components including an address block list 312, a network traffic detection module 314, network traffic analysis module 316, response action module 318, and error logging and reporting module 320.

The description below describes network elements, computers, and/or components of a system and method for improving security information that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). Any of the modules described herein may be associated with a network driver, gateway, proxy server, or other network element, computer or resource.

It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 5:
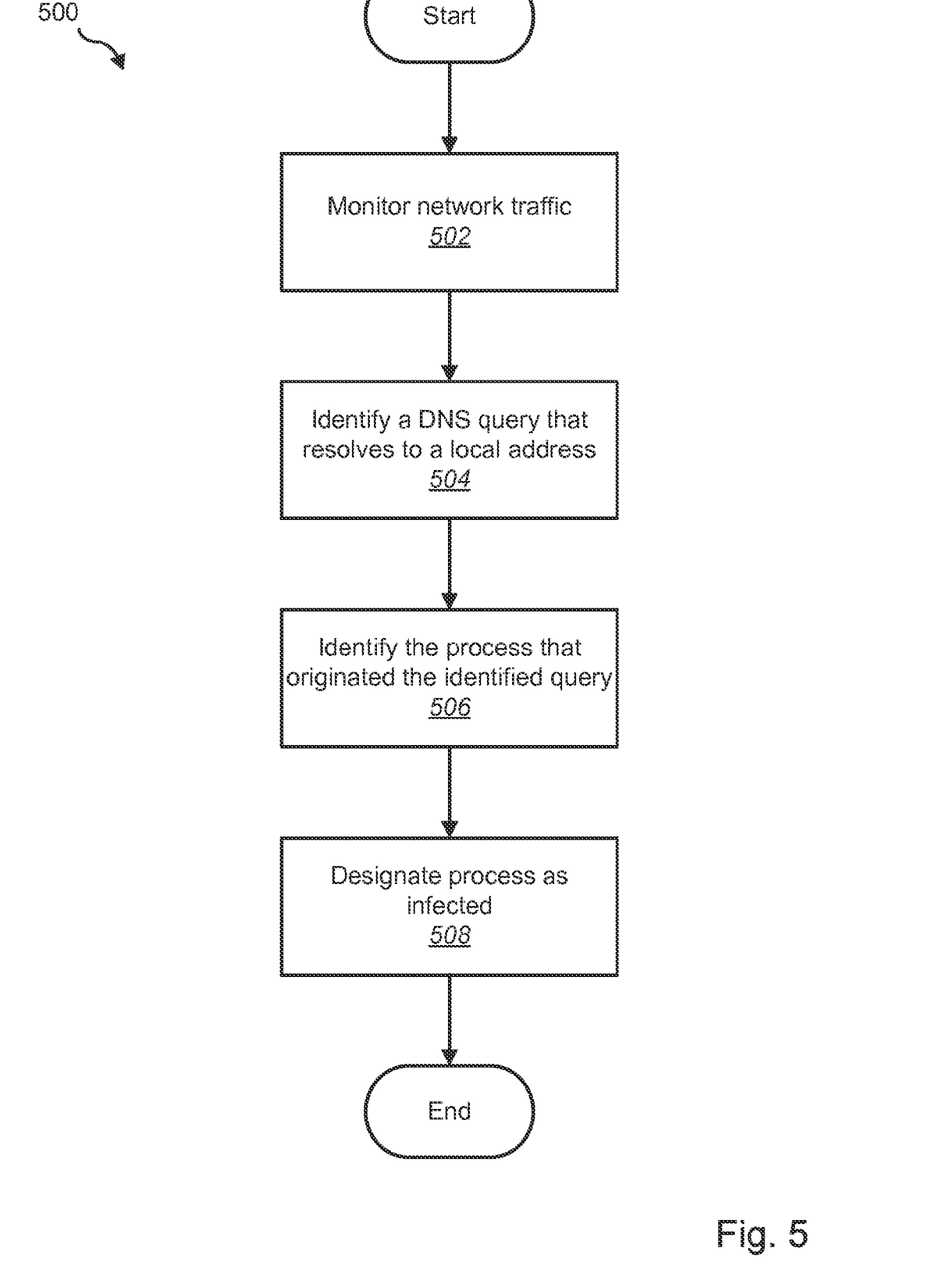
FIG. 5 shows a method for detecting malicious code in accordance with an embodiment of the present disclosure.

An address block list 312 may be a record representing a particular list of addresses associated with malicious communications. The list may include domain names and/or IP addresses. In some implementations, one or more of the addresses on the address block list may be generated using aspects of a method 500 for identifying malicious code as described further herein. In some implementations, the address block list 312 may be periodically updated through communication with an appropriate resource such as a proprietary server.

A network traffic detection module 314 may monitor network traffic associated with the system for which the security management module 310 provides security services. In some implementations, the network traffic detection module 314 may be part of an intrusion detection and prevention system that monitors system network traffic in order to identify and respond to threats.

Each time that the network traffic detection module 314 identifies network traffic, the network traffic analysis module 316 may determine whether the traffic is addressed to a domain name or IP address, and whether the location is on the address block list 312.

Should the network traffic analysis module 316 identify the network traffic as being sent to a location on the list 312, the response action module 318 may respond to the traffic. In some implementations, the process from which the network traffic originated may be identified as infected, and further action may be taken to eliminate or contain the infection. In some implementations, the unauthorized network traffic may be blocked from transmission, and further traffic from the process may be similarly blocked or at least screened.

Where the detected network traffic includes a request for an IP address associated with a domain name, the network traffic analysis module may determine whether the request resolves to a valid external IP address or not. If the request returns no IP address or resolves to a home or localhost address, such as 127.0.0.1 under IPv4, then the response action module 318 may respond to the request. In some implementations, the process originating the request and the details of the request may be logged for further scrutiny. Further requests using the same domain name, or other names within the same second-level domain, may be blocked or may be monitored. The domain name may be added to the address block list.

Error logging and reporting module 320 may produce logs, reports, or other information associated with network traffic detection and system security. In some implementations, these logs may be used as input to a correlation system or security detection system for identifying new malware.

Figure 4A:
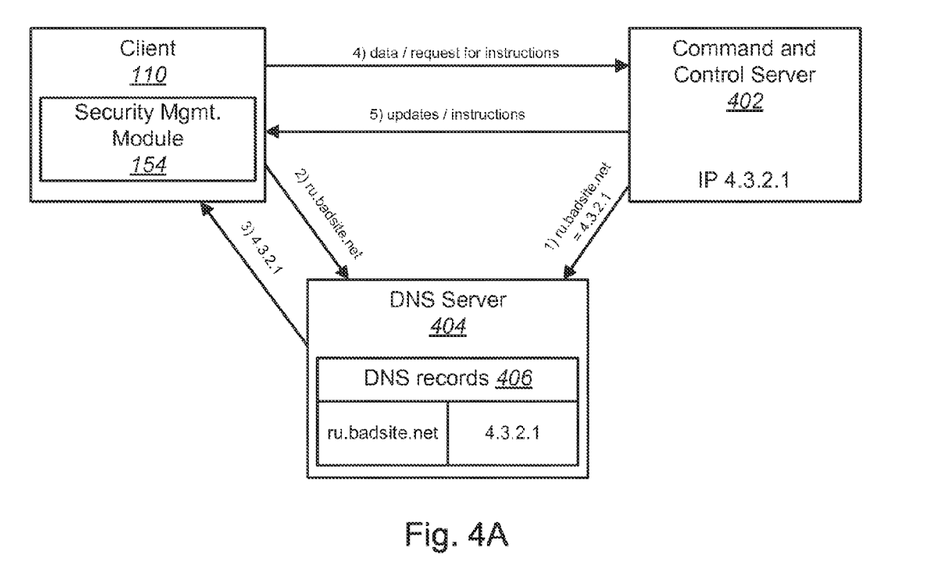
FIG. 4A illustrates communication between an infected client, a DNS server, and an "awake" command and control server.
Figure 4B:
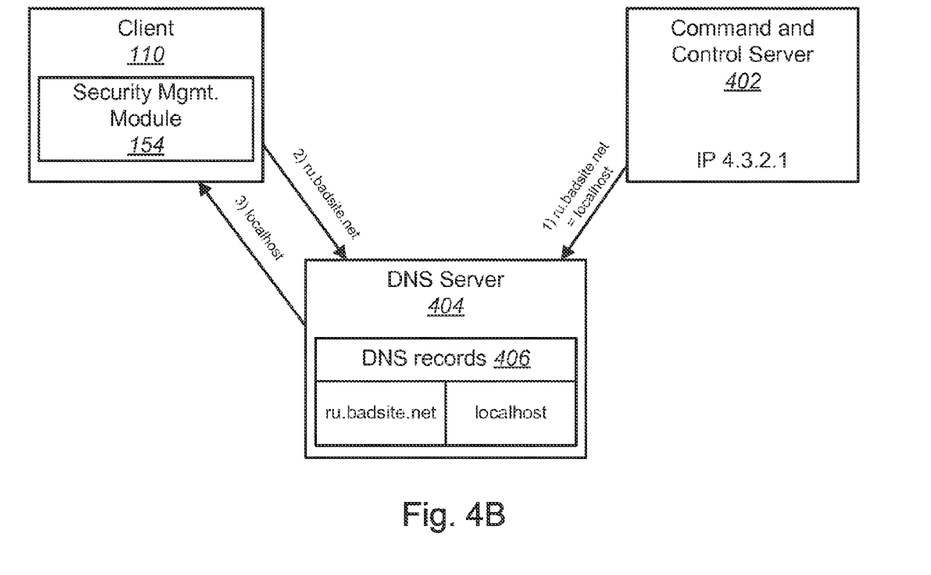
FIG. 4B illustrates communication between an infected client, a DNS server, and a "dormant" command and control server.

FIGS. 4A and 4B illustrate examples of communications that may be identified in accordance with an embodiment of the present disclosure. It will be understood that the communications illustrated in these figures may occur within a network and that relays, proxies, and other techniques may be used (that is, the direct arrows shown and described do not necessarily imply direct communication between devices).

FIG. 4A illustrates an "active" or "awake" command and control (or "C2") server 402 waiting to communication with infected devices, such as the infected client 110. The C2 server 402 has an IP address 4.3.2.1, which may not be recorded anywhere in the malicious code that infects the client 110. When the C2 server 402 becomes active, it communicates to domain name services that its address is to be associated with one or more domain names, in this case ru.badsite.net. Servers such as the DNS server 404 tasked with responding to requests for domains with IP addresses modify their DNS records 406 to reflect that the domain name ru.badsite.net is associated with the IP address 4.3.2.1. The infected client 110 sends a request using the domain name ru.badsite.net, which in some implementations may be one of several possible domain names that the malicious code may have listed to request and which the C2 server may have access to change the DNS records for.

The DNS server 404 refers the client 110 to the IP address 4.3.2.1. The client 110 communicates with the C2 server 402, sending data and requests as necessary and any updates or instructions. The C2 server 402 may be able to manage hundreds or even thousands of infected systems and coordinate targeted attacks or other malicious activity.

FIG. 4B illustrates the C2 server 402 in an "inactive" or "dormant" state, which can prevent traditional methods of detection for malicious activity and make the C2 server 402 more difficult to track down. Here, the C2 server 402 communicates to one or more DNS services that "localhost" should be associated with the domain name ru.badsite.net. When the client 110 submits a request to the DNS server 404, it receives "localhost" in return, and directs any data or requests to the client 110 itself rather than another location on the network. In some implementations, the DNS record 406 for the domain name may instead return 127.0.0.1, NULL, or another term or address that instructs the client 110 to direct the network traffic to the client 110 itself rather than another location on the network. As a result, the request is not submitted to the C2 server 402.

FIG. 5 shows a method 500 for detecting malicious code in accordance with an embodiment of the present disclosure.

At block 502, network traffic is monitored. In some implementations, the network traffic may be monitored by an intrusion prevention and detection system.

At block 504, a DNS query that resolves to a local address is identified. In some implementations, not all such requests may be identified; for example, a "white list" of known DNS queries are benign and known to resolve to a local address may be exempt from this method 400 or treated differently than other DNS queries.

At block 506, the identified query is associated with the process that originated it. This may be determined directly from whatever component of the system is monitoring the traffic.

At block 508, the identified process is designated as infected. In some implementations, this identification may be acted upon in a variety of ways, including quarantining the infected file, remediating or replacing the infected file, and blocking network traffic from the infected file until the file can be cleaned. Various security procedures and methods may be initiated to respond to an infected file and detected anomalous network traffic, including heightened monitoring, alerting a system user, and increased filtering of network traffic. Other reactions to identifying an infected file from anomalous network traffic are known in the art and may be carried out as appropriate.

In some implementations, in response to detecting a DNS request that returns local host, further requests may be monitored and further action taken if the same or a related domain name is the subject of any additional DNS requests. This may occur even if a subsequent DNS request returns a valid external address, and any such returned addresses may also be recorded and subject to scrutiny as a possible C2 server.

In some implementations, the system may monitor for a pattern of behavior rather than responding the first time a process makes an anomalous DNS request. For instance, the system may record each time such a request is detected and designate a process to be infected after a certain number of such requests are made within a certain period of time. In some implementations, an anomalous DNS request may be one of several suspicious behaviors that may be detected and used to determine if a process is infected or if other security-related actions should be taken by the system.

At this point it should be noted that techniques for detecting malicious code in accordance with the present disclosure as described above may involve the processing of input data and the generation of output data to some extent. This input data processing and output data generation may be implemented in hardware or software. For example, specific electronic components may be employed in a security management module or similar or related circuitry for implementing the functions associated with detecting malicious code in accordance with the present disclosure as described above. Alternatively, one or more processors operating in accordance with instructions may implement the functions associated with detecting malicious code in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for detecting malicious code comprising:
   identifying a query to a domain name service that, when submitted to an internet DNS server, resolves to a local address;
   identifying the process that originated the identified query; and
   automatically designating, by at least one computer processor, the identified process as infected based on identifying the process as having originated the query that resolved to a local address.

2. The method of claim 1, further comprising:
   identifying a domain name used in the identified query; and
   blocking a subsequent query based on a relationship between the subsequent query and the identified fully qualified domain name.

3. The method of claim 2, wherein the identified domain name is a fully qualified domain name.

4. The method of claim 2, wherein the subsequent query is blocked based on comparing a domain name used in the subsequent query to the identified domain name.

5. The method of claim 2, further comprising:
   identifying an IP address associated with the identified fully qualified domain name, wherein the subsequent query uses the identified IP address.

6. The method of claim 1, wherein designating the identified process as infected is further based on one or more additional queries prior to the identified query that each resolved to a local address.

7. At least one non-transitory processor readable storage medium storing a computer program of instructions configured to be readable by at least one processor for instructing the at least one processor to execute a computer process for performing the method as recited in claim 1.

8. An article of manufacture for detecting malicious code, the article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
      identify a query to a domain name service that, when submitted to an internet DNS server, resolves to a local address;
      identify the process that originated the identified query; and
      designate the identified process as infected based on identifying the process as having originated the query that resolved to a local address.

9. The article of manufacture of claim 8, wherein the instructions are further configured to cause the at least one processor to operate so as to:
   identify a domain name used in the identified query; and
   block a subsequent query based on a relationship between the subsequent query and the identified fully qualified domain name.

10. The article of manufacture of claim 9, wherein the identified domain name is a fully qualified domain name.

11. The article of manufacture of claim 9, wherein the subsequent query is blocked based on comparing a domain name used in the subsequent query to the identified domain name.

12. The article of manufacture of claim 9, wherein the instructions are further configured to cause the at least one processor to operate so as to identify an IP address associated with the identified fully qualified domain name, and wherein the subsequent query uses the identified IP address.

13. The article of manufacture of claim 8, wherein designating the identified process as infected is further based on one or more additional queries prior to the identified query that each resolved to a local address.

14. A system for detecting malicious code comprising:
   one or more processors communicatively coupled to a network; wherein the one or more processors are configured to:
      identify a query to a domain name service that, when submitted to an internet DNS server, resolves to a local address;

identify the process that originated the identified query; and designate the identified process as infected based on identifying the process as having originated the query that resolved to a local address; and at least one memory, coupled to the one or more processors, configured to provide the one or more processors with instructions.

15. The system of claim 14, wherein the one or more processors are further configured to:

identify a domain name used in the identified query; and block a subsequent query based on a relationship between the subsequent query and the identified fully qualified domain name.

16. The system of claim 14, wherein the identified domain name is a fully qualified domain name.

17. The system of claim 14, wherein the subsequent query is blocked based on comparing a domain name used in the subsequent query to the identified domain name.

18. The system of claim 14, wherein the one or more processors are further configured to identify an IP address associated with the identified fully qualified domain name, and wherein the subsequent query uses the identified IP address.

19. The system of claim 14, wherein designating the identified process as infected is further based on one or more additional queries prior to the identified query that each resolved to a local address.

\* \* \* \* \*